Feb. 28, 1956  E. H. HUGENHOLTZ  2,736,803
FREQUENCY CONTROL
Filed March 15, 1950  2 Sheets-Sheet 1

INVENTOR.
EDUARD HERMAN HUGENHOLTZ.
BY
Fred M. Vogel
AGENT.

INVENTOR.
EDUARD HERMAN HUGENHOLTZ
BY
AGENT

United States Patent Office 2,736,803
Patented Feb. 28, 1956

2,736,803

FREQUENCY CONTROL

Eduard Herman Hugenholtz, Hilversum, Netherlands, assignor to Hartford National Bank and Trust Company, Hartford, Conn., as trustee Application March 15, 1950, Serial No. 149,692

Claims priority, application Netherlands March 16, 1949

18 Claims. (Cl. 250—36)

This invention relates to devices comprising two voltage sources of different frequencies, in which one of the voltage sources is constituted by an oscillator provided with a frequency modulator. In order to lock the frequency of the voltage of higher frequency with a higher harmonic frequency of the voltage of lower frequency, a control voltage is produced by mixing the two voltages in a phase-comparison stage, the said control voltage being supplied by way of a low-pass filter to the input of the frequency modulator.

Depending on whether the frequency of the "high-frequency voltage" or that of the voltage of lower frequency is controlled, such devices may be used as frequency-multipliers or frequency-dividers.

Devices of the said type have been proposed, with which the voltage of lower frequency consists of pulses having a recurrence frequency of, say, 20 to 200 kc./s. Such devices are particularly suitable for interlocking the frequencies of the compared alternating voltages in such manner as to establish synchronism between a harmonic frequency of the pulse-shaped alternating voltage and the high-frequency voltage.

If, however, the frequency of the high-frequency voltage is to be interlocked with the frequency of a non-pulse-shaped alternating voltage of lower frequency, the use of the said device requires this non-pulse-shaped alternating voltage to be converted into a voltage of a pulse-like character. To this end, it is common practice to convert the non-pulse-shaped alternating voltage into voltage pulses with the use of one or more discharge tubes combined with damped circuits.

In order that the frequency of the high frequency voltage may be interlocked with a high harmonic frequency of the pulse-shaped alternating voltage produced, it is necessary in practice that the duration of these pulses should be small relatively to one cycle of the high frequency voltage.

In the aforesaid manner of producing the pulse voltage, however, a limit is set to the reduction of the pulse duration, due, particularly, to the natural capacities of the various electrodes of the discharge tubes.

Furthermore, after the pulse voltage has been obtained by means of the said comparatively complicated circuit arrangement comprising a plurality of tubes, mixing of this pulse voltage with the alternating oscillator voltage takes place in a phase-comparison stage, which requires another tube, for example a diode, triode or hexode forming part of a mixer circuit.

The invention has for its object to obviate said disadvantages.

The arrangement according to the invention exhibits the feature that the phase-comparison stage comprises a cathode-ray tube having an electron beam which is controlled by the two voltages and by which a collecting electrode of the cathode-ray tube is struck intermittently under the control of deflection means connected to the source of voltage of lower frequency.

In the present case, the pulses are produced by an electronic agency and mixed immediately thereupon or simultaneously, with the high-frequency oscillator voltage, so that electrode capacities have substantially no effect, and the duration of the pulses can be materially shortened with respect to the duration of the pulses as produced in known similar arrangements.

In order that the invention may be readily carried into effect, a number of examples will now be described in detail with reference to the accompanying drawings, in which.

Figure 1:
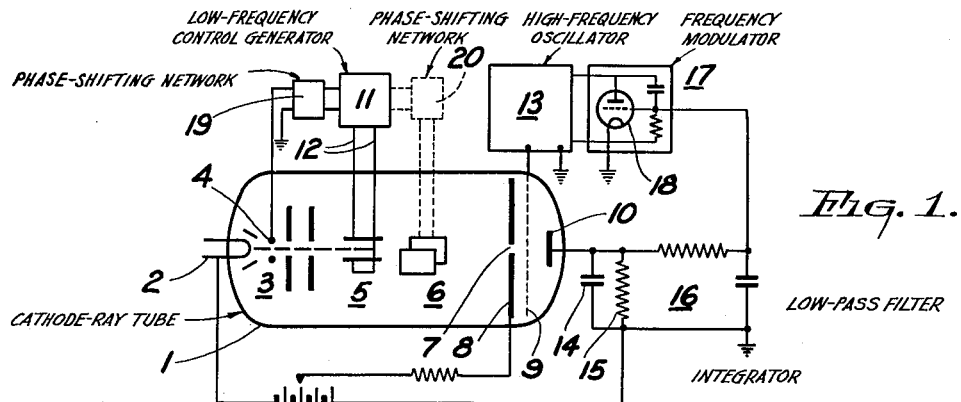
Fig. 1 is a diagrammatic view of an arrangement according to the invention for synchronizing a high-frequency voltage relatively to the frequency of alternating control voltage of lower frequency.

The arrangement shown in Fig. 1 comprises a cathode-ray tube 1 (shown diagrammatically) having a cathode 2, beam-forming electrodes 3, the electrode 4 of which has a controlling effect on the intensity of the electron beam produced, a first set of deflection plates 5, a second set of deflection plates 6, a mask electrode 8 provided with an aperture 7 and having a positive potential with respect to the cathode, a control-grid 9 placed behind the latter and a collecting electrode 10, which also has a positive potential relative to the cathode.

The alternating control voltage of lower frequency is produced by a generator 11 and supplied through conductors 12 to the deflection plates 5. One of the deflection plates may be grounded but, as an alternative, the alternating control voltage may be supplied in push-pull.

Owing to the alternating control voltage acting at the deflection plates 5, the electron beam will sweep across the mask electrode 8, the beam passing through the aperture 7 (twice per cycle) and striking the collecting electrode 10 with an intensity depending upon the voltage operative across the control-grid 9.

To this control grid 9, a high-frequency voltage from a high-frequency oscillator 13 is supplied, if desired in series with a suitable bias, to control the intensity of the beam striking the collecting electrode, in accordance with the phase of the high-frequency voltage.

Across the integrating network 14, 15, which is coupled with the collecting electrode 10 and the time constant of which exceeds the duration of the time interval between the successive current pulses, there is produced an alternating voltage of difference frequency as long as the high-frequency voltage differs in frequency from the frequency of a higher harmonic of the current pulses produced by the beam. This alternating difference frequency voltage has an amplitude which is determined by the mean value of the instantaneous amplitude of the high-frequency voltage occurring during the current pulses. Upon synchronism of a high-frequency voltage and the higher harmonic of the pulses, a direct voltage is produced, whose polarity relative to the mean direct control voltage and whose magnitude vary with the direction and the value of the time-interval between the appearance of a pulse and the neighbouring zero passage of the high-frequency voltage.

If the duration of the current pulse across the collecting electrode 10 exceeds, for example, one quarter cycle of the high-frequency oscillator voltage, the amplitude of the voltage across condenser 14 follows the mean value of the voltage occurring across the control grid 9 during the current pulses. Consequently the amplitude decreases with an increase in duration of the current pulse and completely disappears with equality to one period of the high-frequency oscillator voltage, whereupon it again increases until the duration of one and a half period is reached, after which a decrease follows, and so forth.

In order to obtain a control voltage of suitable value at high-frequencies of the oscillator voltage, the duration of the current pulse should be small relative to the duration of one period of the oscillator voltage.

Very short current pulses of, say $10^{-8}$ sec. are obtained in a simple manner by means of the present arrangement, since the electron beam moves at a great speed across the electrode 8, the distance corresponding to the dimension of the aperture 7 in the direction of motion of the beam being covered in a very short time.

The control-voltage taken from the integrating network is supplied through a low-pass network 16, which does not pass the fundamental frequency of the current pulses, to a frequency modulator 17. This frequency modulator consists of a tube 18, which is wattlessly coupled back so that it constitutes a reactance which is connected in parallel with the frequency-determining circuit of the oscillator 13 and the value of which is adjustable with the use of the control-voltage.

In order to permit a readjustment of the arrangement to a stable condition upon switching on if initially a frequency difference of, say, more than 100 c./s. occurs, it is necessary that the time constant of the control-circuit should be smaller than one quarter of a period of the frequency difference to be corrected, since otherwise a constant variation of the oscillator frequency takes place. Of course, in the above case the frequency control range of the reactance circuit 17 must be chosen to exceed 100 c./s.

The time constant of the control-circuit and thus the maximum frequency difference which can be corrected may, if desired, be controlled by providing a suitable cut-off frequency for the low-pass filter 16. Frequency differences exceeding this cut-off frequency are not automatically eliminated.

In order to avoid interlocking of the high-frequency at a harmonic of the pulses other than the harmonic nearest in regard to frequency, the control-range of the modulator 17 and of the cut-off frequency of the filter 16 should be smaller than the frequency interval or, preferably half of the frequency interval between two successive harmonics of the pulses.

In the arrangement hitherto described, the electron beam passes twice through the aperture 7 during each period of the alternating control voltage, so that only interlocking of the oscillations produced by the oscillator 13 with an even harmonic of the alternating control voltage can take place.

In order to enable interlocking at each harmonic of the alternating control-voltage, the electron beam should either be suppressed once per period of the alternating control voltage or deflected so that the beam passes through the aperture 7 only once per cycle.

Fig. 1 shows two possibilities. In the first case the alternating control voltage is supplied to the electrode 4 through a phase-shifting network 19 which produces a phase shift of, say, 90°, if desired in series with a suitable bias voltage. This electrode controls the intensity of the beam and may be constructed in a known manner.

By the action of the alternating voltage applied to the electrode 4, the beam is suppressed once on being directed twice per cycle to the aperture 7.

In the second solution (shown in broken lines), the alternating control-voltage is supplied through a phase-shifting network 20 to the deflection plates 6. The deflection of the beam produced by these plates is at right angles to that produced by the set of plates 5. The value of the alternating voltage supplied is chosen to be such, in accordance with the dimension of the slit 7 of the aperture 7 or with the dimension of the collecting electrode 10 at right angles to the plane of the drawing, that the beam strikes the collecting electrode 10 only once per period. The second time, when it would strike the collecting electrode without additional means, it is deflected.

If the electron current flowing to the collecting electrode 10 during a current pulse is to be increased, the mask electrode 8 may be brought to a potential exceeding that of the collecting electrode 10, so that secondary emission will take place at the surface of the collecting electrode, which emission may be increased by a suitable treatment of this surface.

Alternatively, intensity modulation of the electron beam may be used, the modulation operating only occurs when the beam has reached the position in which it would pass through the aperture 7. In this event, the cathode-emission may be high without the risk of an undue dissipation occurring at the electrodes of the tube.

The deflection means may alternatively be deflection coils. This, however, involves an additional load on the sources of alternating voltage. On the other hand, the use of deflection coils renders the construction of the cathode-ray tube more simple.

Figure 2:
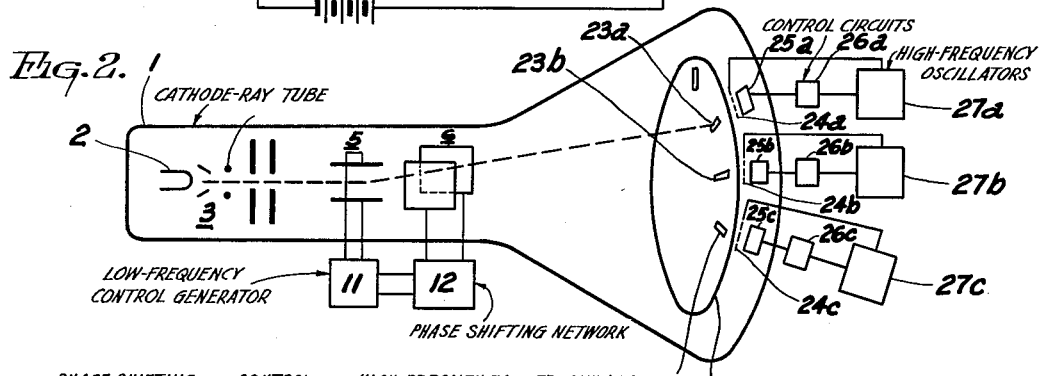
Fig. 2 shows an arrangement by means of which several high-frequency oscillators can be synchronized with equal or different harmonics of an alternating control voltage of lower frequency.

In the device shown in Fig. 2, in which parts corresponding to those of Fig. 1 bear the same reference numerals, the voltage of the alternating control-voltage generator 11 is supplied both to the deflection plates 5 and, by way of a network 21 producing a phase-shift of 90°, to the deflection plates 6.

Consequently, the end of the beam describes a circular path, the beam passing in succession once per period through each of the apertures 23a, 23b, 23c of a mask electrode 22 and so forth.

Behind these apertures are provided control-grids 24a, 24b, 24c, and so forth and collecting electrodes 25a, 25b, 25c, and so forth, the alternating voltages from the high-frequency oscillators 27a, 27b, 27c and so forth being supplied to the associated control electrodes. The control voltages taken from the collecting electrodes are supplied by way of the control-circuits 26a, 26b, 26c, and so forth, to the oscillators.

The use of this arrangement thus permits a great number of oscillators to be synchronized by means of possibly different harmonics of one and the same alternating voltage.

Figure 3:
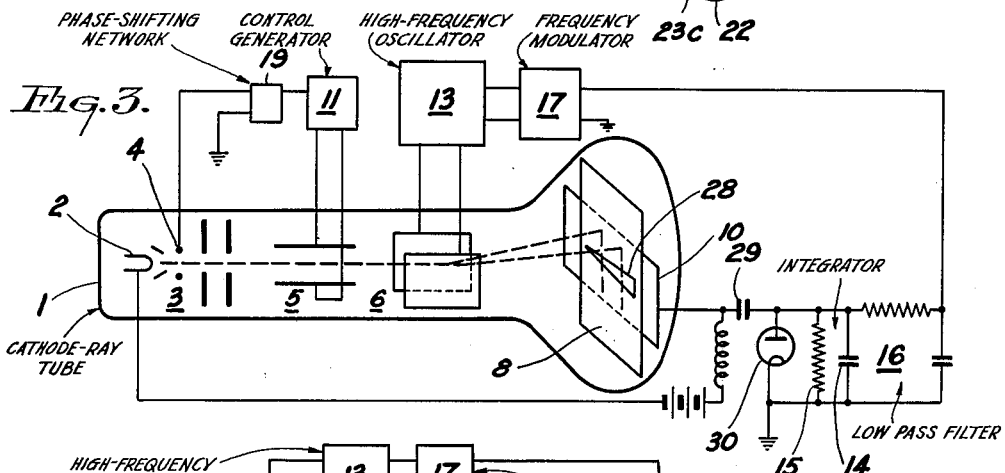
Fig. 3 shows a modified embodiment of an arrangement according to the invention.

In the arrangement shown in Fig. 3, the alternating oscillator voltage is supplied to the deflection plates 6, and the alternating control voltage is again supplied to the deflection plates 5.

The mask electrode 8 has a wedge-shaped aperture 28, so that the dimension of the aperture measured in the direction of deflection of the pair of plates 5 varies continuously in the direction at right angles thereto, corresponding to the direction of deflection of the pair of plates 6. In accordance with the point at which the beam passes through the aperture 28 under the action of the alternating oscillator voltage, the duration of the pulse produced at the collecting electrode 10 increases or decreases.

The collecting electrode 10 is not connected directly to the control grid of the frequency modulator 17, as shown in Fig. 1, but by way of a condenser 29 to the anode of a diode 30. The diode operates as a peak detector in cooperation with the integrating network 14, 15 included in the output circuit. If necessary, the collecting electrode 10 and the diode 30 may have connected between them an amplifier for the amplification of the alternating voltage with the current pulse recurrence frequency, occurring across the collecting electrode. The voltage set up across the output condenser 16 is determined, owing to the presence of the peak detector, by the maximum instantaneous value of the alternating oscillator voltage occurring during the current pulse duration.

It is pointed out that it is not necessary for the alternating oscillator voltage to be supplied to a control device of the electron beam other than that to which the alternating control voltage is supplied.

Instead of supplying the alternating oscillator voltage to the control-grid 9, as shown in Fig. 1, or to a second set of deflection plates 6 at right angles to the first, as shown in Fig. 3, the alternating oscillator voltage may, as an alternative, be supplied together with the alternating control-voltage to the deflection plates 5.

During the movement produced by the alternating control voltage, the electron beam will now be accelerated and delayed periodically in this movement, owing to the control by the alternating oscillator voltage. When the beam passes through the aperture of the electrode 8 during an acceleration, only little current flows to the collecting electrode 10 and a stronger current flows during the delay, so that mixing again takes place.

Since, in this event, the generators are both coupled with the deflection plates 5, so that a reciprocal coupling occurs, it is preferable to cause the alternating oscillator voltage to act at a second set of the deflection plates with the same direction of deflection as the plates 5, but arranged to be shielded from the latter. The effect obtained is the same, but coupling between the generators is avoided.

Figure 5:
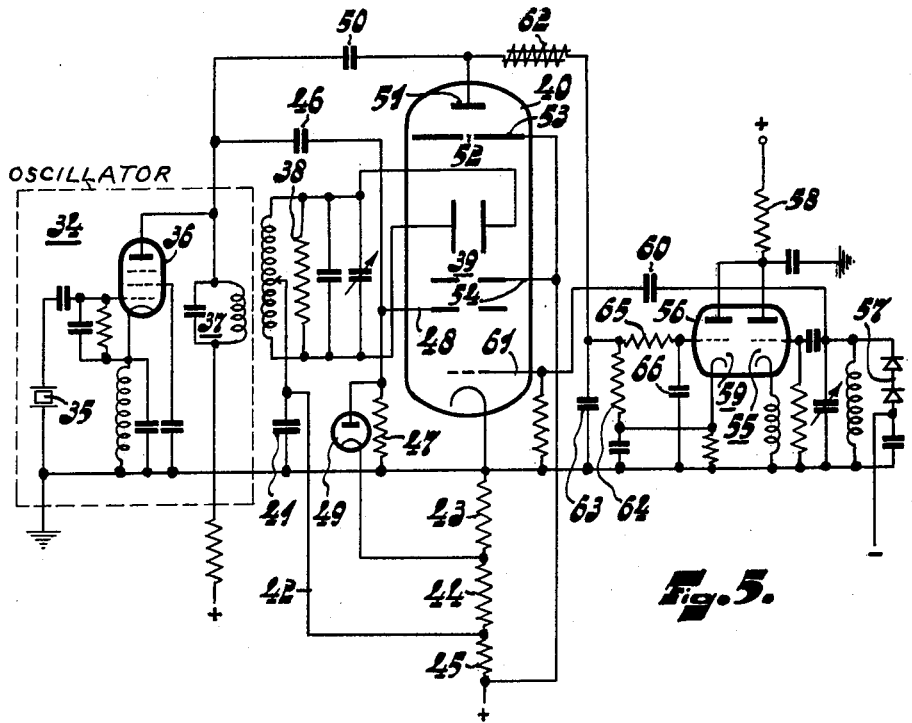
Fig. 5 shows further details of a circuit used in an arrangement according to the invention.

As appears from Fig. 5, the alternating oscillator voltage may be supplied to an intensity-control electrode for the cathode beam such that the beam is periodically suppressed even before reaching the deflection plates 5, the beam being released just when the position, as determined by the action of the alternating control voltage set up at the plates 5, corresponds to the entrance of the beam into the aperture of the mask electrode 8, so that a current pulse passes towards the collecting electrode 10.

In the devices hitherto described, the highest frequency which can be synchronized is limited by the capacity and the inductance of the control electrodes. This limitation becomes of importance at frequencies (approximately $10^9$ c./s.) which are considerably higher than those for the known arrangement referred to in the preamble.

Figure 4:
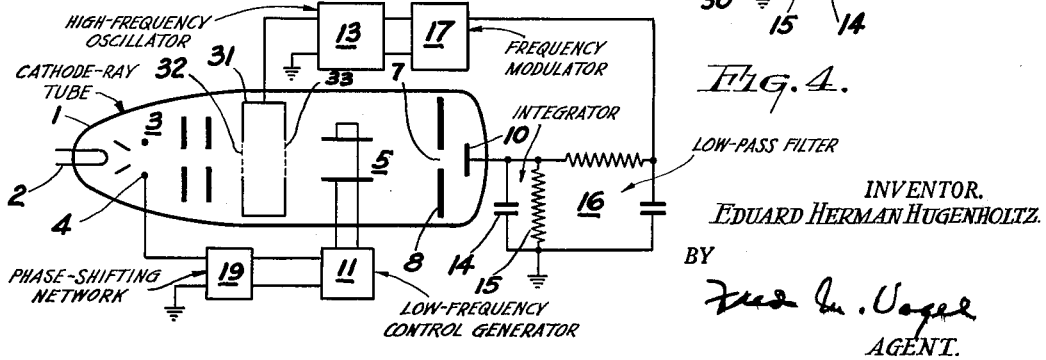
Fig. 4 shows diagrammatically a further embodiment.

Fig. 4 shows one embodiment of an arrangement according to the invention by means of which voltages of still higher frequency can be controlled.

The arrangement differs from that shown in Fig. 1 in that the cathode-ray tube comprises a cavity resonator 31 which is excited by the oscillator 13. The electron beam traverses this resonator, through two grid-shaped parts of the walls 32 and 33, so that velocity modulation occurs. Subsequently the velocity-modulated beam is deflected by the alternating control-voltage operating across the deflection plates 5. The electrode 8 is arranged at such a distance that the intensity modulation caused by the speed modulation attains a maximum value at the area of the aperture 7.

It will be obvious that the resonator may, as an alternative, be arranged behind the deflection plates 5, so that first deflection and then velocity-modulation take place.

In Fig. 5, the alternating control-voltage generator is a crystal oscillator 34, the crystal 35 being included in the control-grid circuit of a discharge tube 36 and an oscillatory circuit 37 being included in the anode circuit of the tube. The oscillatory circuit 37 constitutes the primary circuit of a band-pass filter, the secondary circuit of which is designated 38.

The deflection voltage for the deflection plates 39 of the cathode-ray tube 40 is taken in push-pull from the secondary circuit 38. To this end, the central tapping of the secondary winding of the transformer of the band-pass filter is earthed through a condenser 41, as far as high-frequency currents are concerned, and connected through a voltage conductor 42 having a suitable fixed bias voltage taken from a voltage divider 43, 44, 45.

The voltage for suppressing the electron beam is taken from the primary circuit 37, which ensures the desired phase shift of 90°, and supplied through a blocking condenser 46 and a resistance 47 to the intensity-control electrode 48 of the cathode-ray tube.

In order to limit the supplied suppressing voltage, a diode 49 is connected in series with a bias voltage taken from the voltage divider 43, 44, 45, in parallel with the resistance 47.

The alternating voltage across the circuit 37 is at the same time supplied, by way of a condenser 50, directly to the collecting electrode 51 of the cathode-ray tube and thus yields the desired supply voltage.

The mask electrode 53 having an aperture 52, and an anode 54 forming the beam are directly connected to the positive terminal of the voltage supply.

As a high-frequency oscillator, use is made of a tuned grid-oscillator of a type known per se. The tube of this oscillator is constituted by the right-hand triode part 55 of the tube 56. The control-grid circuit includes a voltage-limiting circuit which is obtained by means of rectifying cells 57 and a suitable negative bias voltage.

The oscillator frequency is obtained by controlling the anode voltage. For this purpose the anode of the triode 55 is connected to a tapping of a potentiometer across the voltage supply. This potentiometer is constituted by the series-connection of a resistance 58 and the internal resistance of the left-hand triode part 59 of tube 56.

Alternating oscillator voltage is supplied through a condenser 60 to the control-grid 61 of the cathode-ray tube 40.

Consequently, the intensity of the electron beam of the tube is modulated according to the frequency of the alternating oscillator voltage.

The collecting electrode 51 of the cathode-ray tube is coupled by way of a choke 62 for suppressing the crystal oscillator frequency, with an intergrating network consisting of a capacity 63 and a resistance 64. The control voltage produced across the latter is supplied by means of a low-pass filter 65, 66 to the control-grid of the triode part 59 of tube 56.

Under the action of this control-voltage, the internal resistance of the triode part 59 and the anode voltage of the triode 55 of the oscillator are controlled, so that the frequency of the oscillator may be made to correspond with a harmonic, for example the 200th harmonic, of the crystal oscillator frequency.

It is to be noted that if, in one of the arrangements according to the invention, the deflection plates of the cathode-ray tube require to be supplied with such a high alternating voltage that the beam strikes the deflection plates themselves on the occurrence of the maximum amplitude, this beam can be suppressed upon exceeding a given amplitude of the deflection voltage.

If, for example, it is not advisable to supply a comparatively high voltage of alternating control-voltage frequency to the deflection plates of the cathode-ray tube, a harmonic may be supplied to them.

In this event, the superposition of the alternating control voltage and a voltage of, for example, the fifth harmonic frequency, is supplied to an intensity control electrode so that once per period of the alternating control-voltage a comparatively strong and short positive voltage pulse across this electrode.

Figure 7:
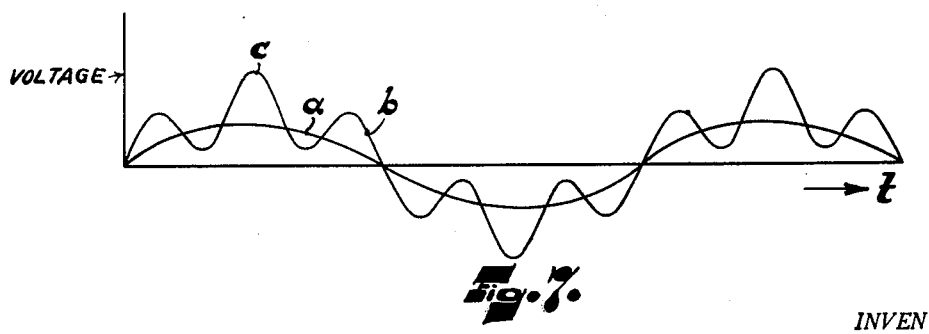
Fig. 7 shows the operation of this circuit and arrangement.

The variation of such a superposed voltage is shown in Fig. 7, where curve $a$ indicates the variation of the alternating control voltage as a function of time. On this voltage is superposed a voltage of the fifth harmonic frequency, thus obtaining a curve $b$.

Once per period of the alternating control voltage, this curve b has a strong maximum c.

If the superposed voltage, as the case may be in series with a suitable bias voltage, is supplied to an intensity-control grid of the cathode-ray tube, the beam is allowed to pass only during the occurrence of the pulse voltage c and otherwise suppressed.

If the deflection plates are now supplied with a voltage of the same fifth harmonic frequency, but with a phase shift of 90°, the beam will strike the collecting electrode only once per period of the alternating control voltage.

For producing a short current pulse at this collecting electrode, an amplitude of this fifth harmonic only one fifth as large as required, as would be required when supplying the alternating control voltage itself.

Figure 6:
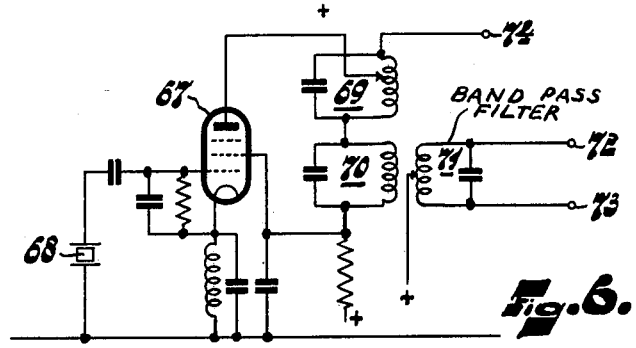
Fig. 6 shows one embodiment of a circuit for an alternating control voltage generator, which is used in an arrangement, wherein an odd harmonic of the alternating control voltage is supplied to deflection plates of a cathode-ray tube

For producing the said voltages, the alternating control voltage generator may, for example, be arranged as is shown in the circuit-arrangement of Fig. 6.

The generator shown in Fig. 6 is a crystal oscillator. The control grid circuit of the discharge tube 67 comprises a crystal 68. The anode circuit of the tube comprises the series connection of the circuits 69 and 70. The circuit 70 is connected together with a circuit 71 as a band-pass filter, so that a voltage having a shift of 90° relatively to the voltage across the circuit 70 is produced across the circuit 71.

The voltage of oscillator frequency occurs across the circuit 69, the voltages of the fifth harmonic frequency occurring across the circuit 70 and 71.

From the terminals 72 and 73 is taken the deflection voltage for the cathode-ray tube and from the output 74 is taken the super-position for the intensity-control electrode.

If in the represented examples, the generator for the said voltage of lower frequency comprises a frequency modulator and the control voltage obtained is applied thereto, the high-frequency voltage acts as a control voltage and the frequency of the voltage of lower frequency is interlocked with a sub-harmonic of the frequency of the high-frequency voltage.

What I claim is:

1. Apparatus for maintaining an electromagnetic wave of relatively high-frequency produced by a first source in isochronism with a given harmonic component of an electromagnet wave of lower frequency produced by a second source comprising a frequency modulator controlling said first source, a phase comparison device for producing said control voltage, said device comprising a cathode ray tube provided with an electron gun for producing an electron beam, a collecting electrode disposed in the path of said beam, deflection means for said beam and intersecting control means for said beam, means to supply said second wave to said deflection means to deflect said beam reciprocally in a direction at which said beam is caused intermittently to impinge upon said collecting electrode to produce current pulses herein, means to apply said first wave to said intensity control means to modulate said pulses in accordance with their phase relationship to said first wave and means including a low-pass filter coupled to said collecting electrode to derive a control voltage from the pulses yielded by said collecting electrode dependent on the phase and frequency difference between said wave and said given harmonic component whereby said control voltage is an alternating voltage when said first wave and said component differ in frequency and is a direct voltage when said first wave and said component differ in phase, and means to apply said control voltage to said frequency modulator to effect said isochronism.

2. A phase comparison device as set forth in claim 1 wherein the duration of each of said current pulses is less than one-half the period of each cycle of said first wave.

3. A phase comparison device as set forth in claim 1 wherein said means coupled to said collecting electrode includes an integrating network.

4. In apparatus for maintaining an electromagnetic wave of relatively high-frequency produced by a first source in isochronism with a harmonic component of an electromagnet wave of lower frequency produced by a second source wherein a control voltage dependent on the phase and frequency difference between said high-frequency wave and said harmonic component is produced, a phase comparison device for producing said control voltage, said device comprising a cathode ray tube provided with an electron gun for producing an electron beam, a collecting electrode disposed in the path of said beam deflection means for said beam and intensity control means for said beam, means to supply said second wave to said deflection means to deflect said beam reciprocally in a direction at which said beam is caused intermittently to impinge upon said collecting electrode to produce current pulses therein, means to apply said wave to said intensity control means to modulate said pulses in accordance with their phase relationship to said first wave, and means including an integrating network and coupled to said collecting electrode to derive said control voltage from the pulses yielded by said collecting electrode whereby said control voltage is an alternating voltage when said first wave and said component differ in frequency and is a direct voltage when said first wave and said component differ in phase, a low-pass filter coupled to said integrating network and having a time constant which exceeds the time interval between any two successive current pulses, a frequency modulator coupled to said first source, and means to supply said control voltage through said filter to said modulator to control the frequency of said first source accordingly.

5. Apparatus as set forth in claim 4 wherein the time constant of said network and the control range of said modulator have values at which said first wave and said harmonic component may be brought into synchronization when their initial frequency difference exceeds 100 cycles per second.

6. In apparatus for maintaining an electromagnetic wave of relatively high-frequency produced by a first source in isochronism with a harmonic component of an electromagnet wave of lower frequency produced by a second source wherein a control voltage dependent on the phase and frequency difference between said high-frequency wave and said harmonic component is supplied through a low-pass filter to a frequency modulator controlling said first source, a phase comparison device for producing said control voltage, said device comprising a cathode ray tube provided with an electron gun for producing an electron beam, a collecting electrode disposed in the path of said beam, a mask electrode having an aperture and disposed in front of said collecting electrode in the path of said beam, deflection means for said beam and intensity control means for said beam, means to supply said second wave to said deflection means to deflect said beam reciprocally in a direction at which said beam is caused intermittently to pass through the aperture of said masking electrode and impinge upon said collecting electrode to produce current pulses therein, means to apply said first wave to said intensity control means to modulate said pulses in accordance with their phase relationship to said first wave, and means coupled to said collecting electrode to derive said control voltage from the pulses yielded by said collecting electrode whereby said control voltage is an alternating voltage when said first wave and said component differ in frequency and is a direct voltage when said first wave and said component differ in phase.

7. A phase comparison device as set forth in claim 6 wherein said collecting electrode is a secondary emission electrode, said device further including means to maintain said collecting electrode at a low potential with respect to said mask electrode.

8. A phase comparison device as set forth in claim 6 wherein said means coupled to said collecting electrode includes a peak detector.

9. In apparatus for maintaining an electromagnetic wave of relatively high-frequency produced by a first source in isochronism with a harmonic component of an electromagnet wave of lower frequency produced by a second source wherein a control voltage dependent on the phase and frequency difference between said high-frequency wave and said harmonic component is supplied through a low-pass filter to a frequency modulator controlling said first source, a phase comparison device for producing said control voltage, said device comprising a cathode ray tube provided with an electron gun for producing an electron beam, a collecting electrode disposed in the path of said beam, a mask electrode having an aperture and disposed in front of said collecting electrode in the path of said beam, intensity control means for said beam, and deflection means for said beam, means to supply said second wave to said deflection means to deflect said beam reciprocally in a direction at which said beam is caused intermittently to pass through the aperture of said masking electrode and impinge upon said collecting electrode to produce current pulses therein, means to apply said first wave to said intensity control means to modulate said pulses in accordance with their phase relationship to said first wave, and means coupled to said collecting electrode to derive said control voltage from the pulses yielded by said collecting electrode whereby said control voltage is an alternating voltage when said first wave and said component differ in frequency and is a direct voltage when said first wave and said component differ in phase.

10. A phase comparison device as set forth in claim 9 wherein said intensity control means includes a cavity resonator disposed in the path of said beam.

11. A phase comparison device as set forth in claim 9 wherein said intensity control means includes a control grid disposed between said masking and collecting electrodes in the path of said beam and coupled to said first source.

12. A phase comparison device as set forth in claim 9 further including control grid disposed between said masking electrode and said gun in the path of said beam and coupled to said second source.

13. In apparatus for maintaining an electromagnetic wave of relatively high-frequency produced by a first source in isochronism with a harmonic component of an electromagnet wave of lower frequency produced by a second source wherein a control voltage dependent on the phase and frequency difference between said high-frequency wave and said harmonic component is supplied through a low-pass filter to a frequency modulator controlling said first source, a phase comparison device for producing said control voltage, said device comprising a cathode ray tube provided with an electron gun for producing an electron beam, a collecting electrode disposed in the path of said beam, electrostatic deflection means for said beam and intensity control means for said beam, means to supply said second wave to said deflection means to deflect said beam reciprocally in a direction at which said beam is caused intermittently to impinge upon said collecting electrode to produce current pulses therein, means to apply said first wave to said intensity control means to modulate said pulses in accordance with their phase relationship to said first wave, means coupled to said tube to suppress said electron beam when the instantaneous value of said second wave attains a predetermined value, and means coupled to said collecting electrode to derive said control voltage from the pulses yielded by said collecting electrode whereby said control voltage is an alternating voltage when said first wave and said component differ in frequency and is a direct voltage when said first wave and said component differ in phase.

14. In apparatus for maintaining a plurality of electromagnetic waves of relatively high-frequency produced by a like plurality of first sources in isochronism with a harmonic component of an electromagnet wave of lower frequency produced by a second source wherein a like plurality of control voltages respectively dependent on the phase and frequency difference between corresponding high-frequency waves and said harmonic component is supplied through a like plurality of low-pass filters to a like plurality of frequency modulators controlling corresponding sources, a phase comparison device for producing said control voltages, said device comprising a cathode ray tube provided with an electron gun for producing an electron beam, a like plurality of collecting electrodes disposed in the path of said beam, a like plurality of control grids disposed in the path of said beam, a like plurality of control grids disposed in the path of said beam between said deflection means and corresponding collecting electrodes, and deflection means for said beam, means to apply said plurality of first waves to corresponding control grids to vary the intensity of said beam accordingly, means to supply said second wave to said first deflection means with a predetermined phase shift to deflect said beam reciprocally in a direction at which said beam is caused intermittently to impinge upon said collecting electrode in sequence to produce current pulses therein, and means coupled to each of said collecting electrodes to derive corresponding control voltage from the pulses yielded by said each of said collecting electrode whereby each voltage is an alternating voltage when the corresponding first wave and said component differ in frequency and is a direct voltage when the corresponding first wave and said component differ in phase.

15. In apparatus for maintaining an electromagnetic wave of relatively high-frequency produced by a first source in isochronism with a harmonic component of an electromagnet wave of lower frequency produced by a second source wherein a control voltage dependent on the phase and frequency difference between said high-frequency wave and said harmonic component is supplied through a low-pass filter to a frequency modulator controlling said first source, a phase comparison device for producing said control voltage, said device comprising a cathode ray tube provided with an electron gun for producing an electron beam, a collecting electrode disposed in the path of said beam, a mask electrode having an aperture and disposed in front of said collecting electrode in the path of said beam, a control electrode disposed in front of said mask electrode in the path of said beam, an intensity control element disposed in the path of said beam between said mask electrode and said collecting electrode and deflection means for said beam, means to apply said first wave to said intensity control element to vary the intensity of said beam accordingly, means to supply said second wave to said deflection means to deflect said beam reciprocally in a direction at which said beam is caused periodically to pass through the aperture of said masking electrode and impinge upon said collecting electrode to produce current pulses therein, means to apply said second wave to said control electrode to periodically block said beam to an extent at which said beam only passes through the aperture of said masking electrode once each cycle of said second wave, and means coupled to said collecting electrode to derive said control voltage from the pulses yielded by said collecting electrode whereby said control voltage is an alternating voltage when said first wave and said component differ in frequency and is a direct voltage when said first wave and said component differ in phase.

16. In apparatus for maintaining an electromagnetic wave of relatively high-frequency produced by a first source in isochronism with a harmonic component of an electromagnet wave of lower frequency produced by a second source wherein a control voltage dependent on the phase and frequency difference between said high-frequency wave and said harmonic component is supplied through a low-pass filter to a frequency modulator controlling said first source, a phase comparison device for producing said control voltage, said device comprising a cathode ray tube provided with an electron gun for producing an electron beam, a collecting electrode disposed in the path of said beam, a mask electrode having an aperture and disposed in front of said collecting electrode in the path of said beam, an intensity control element disposed in the path of said beam between said mask electrode and said collecting electrode and first and second deflection means for said beam for deflecting said beam in respective directions at right angles to each other, means to apply said first wave to said intensity control element to vary the intensity of said beam accordingly, means to supply said second wave to said first and second deflection means to deflect said beam reciprocally in directions at which said beam is caused periodically to pass through the aperture of said masking electrode only once each cycle of said second wave and impinge upon said collecting electrode to produce current pulses therein, and means coupled to said collecting electrode to derive said control voltage from the pulses yielded by said collecting electrode whereby said control voltage is in an alternating voltage when said first wave and said component differ in frequency and is a direct voltage when said first wave and said component differ in phase.

17. In apparatus for maintaining an electromagnetic wave of relatively high-frequency produced by a first source in isochronism with a harmonic component of an electromagnetic wave of lower frequency produced by a second source wherein a control voltage dependent on the phase and frequency difference between said high-frequency wave and said harmonic component is supplied through a low-pass filter to a frequency modulator controlling said first source, a phase comparison device for producing said control voltage said device comprising a cathode ray tube provided with an electron gun for producing an electron beam, a collecting electrode disposed in the path of said beam, a mask electrode having a wedge-shaped aperture and disposed in front of said collecting electrode in the path of said beam, and first and second deflection means for said beam to deflect same in respective directions at right angles to each other, means to supply said second wave to said first deflection means to deflect said beam reciprocally in a direction at which said beam is caused intermittently to pass through the aperture of said masking electrode and impinge upon said collecting electrode to produce current pulses therein, means to apply said first wave to said second deflection means to deflect said beam in a direction with respect to said aperture whereby said beam pulses are modulated in accordance with their phase relationship to said first wave, and means coupled to said collecting electrode to derive said control voltage from the pulses yielded by said collecting electrode whereby said control voltage is an alternating voltage when said first wave and said component differ in frequency and is a direct voltage when said first wave and said component differ in phase.

18. In apparatus for maintaining an electromagnetic wave of relatively high-frequency produced by a first source in isochronism with a harmonic component of an electromagnet wave of lower frequency produced by a second source wherein a control voltage dependent on the phase and frequency difference between said high-frequency wave and said harmonic component is supplied through a low-pass filter to a frequency modulator controlling said first source, a phase comparison device for producing said control voltage, said device comprising a cathode ray tube provided with an electron gun for producing an electron beam, a collecting electrode disposed in the path of said beam, a control electrode for controlling the intensity of said beam and deflection means for said beam, means to derive a voltage of harmonic frequency from said second wave, means to supply said voltage of harmonic frequency to said deflection means to deflect said beam reciprocally in a direction at which said beam is caused intermittently to impinge upon said collecting electrode to produce current pulses therein, means to apply said first wave to said control electrode to modulate said pulses in accordance with their phase relationship to said first wave, and means coupled to said collecting electrode to derive said control voltage from the pulses yielded by said collecting electrode whereby said control voltage is an alternating voltage when said first wave and said component differ in frequency and is a direct voltage when said first wave and said component differ in phase.

References Cited in the file of this patent

UNITED STATES PATENTS

| Number | Name | Date |
|---|---|---|
| 1,450,966 | Affel | Apr. 10, 1923 |
| 1,977,398 | Morrison | Oct. 16, 1934 |
| 2,053,268 | Davis | Sept. 8, 1936 |
| 2,197,041 | Gray | Apr. 16, 1940 |
| 2,244,260 | Power | June 3, 1941 |
| 2,265,311 | Preisach et al. | Dec. 9, 1941 |
| 2,365,476 | Knoop, Jr. et al. | Dec. 19, 1944 |
| 2,417,450 | Sears | Mar. 18, 1947 |
| 2,473,691 | Meacham | June 21, 1949 |
| 2,495,738 | Labin | Jan. 31, 1950 |
| 2,496,633 | Llewellyn | Feb. 7, 1950 |
| 2,515,931 | Six et al. | July 18, 1950 |
| 2,547,386 | Gray | Apr. 3, 1951 |
| 2,552,140 | Boothroyd | May 8, 1951 |
| 2,570,790 | Gray | Oct. 9, 1951 |
| 2,575,393 | Peterson et al. | Nov. 20, 1951 |
| 2,583,562 | Gray | Jan. 29, 1952 |
| 2,617,016 | Knol et al. | Nov. 4, 1952 |
| 2,653,184 | Robinson | Sept. 22, 1953 |